United States Patent Office 3,673,013
Patented June 27, 1972

3,673,013
ILLUMINATING FLARE COMPOSITION
George A. Lane, Midland, and William Arthur Smith, Westland, Mich., and Stephen C. Dollman, Morris Plains, Seymour M. Kaye, Dover, and Francis R. Taylor, Mount Arlington, N.J.; said Lane and said Smith assignors to The Dow Chemical Company, Midland, Mich., and said Dollman, said Kaye and said Taylor assignors to the United States of America as represented by the Secretary of the Army
No Drawing. Filed Oct. 6, 1970, Ser. No. 78,643
Int. Cl. C06d 1/10
U.S. Cl. 149—19
10 Claims

ABSTRACT OF THE DISCLOSURE

Disclosed is an illuminating flare composition comprising particulate magnesium as fuel, an alkali metal nitrate or perchlorate as oxidizer together with a binder system containing a high percentage of oxygen. The binder system is made up of the reaction product of an amine or acid anhydride curable epoxy resin and an amine terminated composition or acid anhydride as curing agent together with a plasticizer containing at least 40 percent oxygen.

---

The invention herein described was made in the course of or under a contract or subcontract thereunder with the Department of the Army.

Illuminating flare compositions employing particulate magnesium and an alkali metal nitrate or perchlorate are known. Compositions commonly in use today incorporate magnesium and oxidizer into a granular type flare by mixing these materials with a polyester binder and pressing at pressures up to 4000 p.s.i. or higher. Pressing at these elevated pressures is a hazardous as well as expensive operation. Also, the requirement that a flare be pressed at high pressures makes the manufacture of certain grain sizes and configurations impractical.

A castable flare formulation, i.e. a composition which can be poured into a mold and fully cured at ambient or moderately elevated temperatures, is desirable since it makes possible the fabrication of flares of various sizes and configurations which are not readily prepared by pressing techniques. A composition having a viscosity of less than $5 \times 10^5$ centipoise is considered pour castable.

The present invention is an illuminating flare composition which comprises particulate magnesium as fuel, an alkali metal nitrate or perchlorate as oxidizer together with a plasticized polymeric binder system. The magnesium particles which range in size from 25 to 250μ in their longest dimension make up from 43 to 70 percent of the composition. As used herein, magnesium is intended to mean elemental magnesium and alloys containing greater than 70% magnesium. The oxidizer is in particulate form, i.e. from 10 to 750μ in the longest dimension, and makes up from 21 to 50 percent of the composition. The binder system is made up of the reaction product of an amine or acid anhydride curable epoxy resin and an amine terminated polyalkylene oxide; alkylene polyamine; alkyl, aryl, or mixed alkyl-aryl amines; or acid anhydride in which the epoxy resin accounts for from 30 to 95 percent of the product. The product is further characterized by containing at least 30 percent chemically combined oxygen and contains a plasticizer having at least 40 percent oxygen. The binder system makes up from 2 to 30 percent of the composition while the plasticizer accounts for from 5 to 85 percent of the binder.

As used herein, all percents are intended to be by weight unless otherwise specified.

In a preferred embodiment, the present composition contains from 45 to 55 percent essentially spherical magnesium particles having a mean particle diameter distribution of from 125 to 250μ. Bi- or multi-modal size distribution is preferred for most efficient packing of the magnesium particles. Sodium nitrate particles having mean diameters from 25 to 250μ are preferred for use as the oxidizer which is preferably employed in an amount of from 25 to 33 percent of the composition.

A number of amine terminated polyglycol cured epoxy resin binders have been found to be especially effective for use in the present binder system. Examples of useful epoxy resins are the diglycidyl ether of polypropylene glycol containing 27 percent oxygen, glycerine diglycidyl ether (GDGE) and a glycerine glycidyl ether having an average functionality of between 2 and 3 (GDGE 2/3). The latter two resins have an oxygen content, determined by analysis, of 32 and 34 percent, respectively. Additionally, ethylene glycol diglycidyl ether, polyethylene glycol diglycidyl ethers and the polyglycidyl esters of polyfunctional acids may readily be used.

The epoxy resins are preferably cured with an amine terminated polypropylene oxide having an average molecular weight of 250 or the partial nitrate or perchlorate salt thereof. The amine terminated polypropylene oxide, hereinafter referred to as APO, has an analyzed oxygen content of 23 percent. The nitrate and perchlorate salts of APO, i.e. APO nitrate and APO perchlorate, have analyzed oxygen contents of 30 percent and are therefore preferred for use as curing agents. Other amine terminated polyalkylene oxides, e.g. polyethylene oxide or polybutylene oxide, as well as the nitrate or perchlorate salts thereof, which are curable liquids and contain the requisite high percentages of oxygen, may be used. Alternatively, acid anhydrides may be used as curing agents. Examples of acid anhydrides which contain the requisite amount of oxygen are maleic, fumaric, succinic, and pyromellitic anhydride.

The inclusion of an oxygen rich plasticizer in the binder system increases the luminous efficiency of the flare composition. Useful plasticizers are those compositions which contain greater than 40 percent oxygen and either decrease or do not excessively increase the viscosity of the flare composition when added thereto. Examples of such plasticizers are nitroglycerine, diethylene-glycol dinitrate (DEDGN), monoethanolamine nitrate, ethylene carbonate, ethylene glycol, ethylene glycol dimethyl ether, glycerine, triethylene glycol dinitrate (TEGDN) and polyglycidyl nitrate.

The inclusion of an oxygen rich nitrated plasticizer such as TEGDN is preferred for obtaining light output in a castable flare system equivalent to that obtainable with a standard pressed flare. While the oxygen content of other ingredients comprising the binder system is reflected in improved luminous efficiency, the incorporation of a nitroplasticizer such as TEGDN results in luminous efficiency increases of at least two-fold over a non-plasticized binder system of equivalent oxygen content. The nitroplasticizer TEGDN has been found to be an excellent plasticizer for castable flare compositions. It is oxygen-rich (56%), energetic, safe, and compatible with epoxy resins.

Normally an amount of plasticizer is employed sufficient to improve the flare's performance without excessively degrading its physical properties. The plasticizer may be used in an amount of from 5 to 85 percent of the binder system. The amount of plasticizer is preferably from 30 percent to 65 percent at higher binder levels, i.e. 18 to 30 percent and from 20 to 65 percent at lower binder levels, i.e. 2 to 18 percent. By incorporating the plasticizer into the binder system and selecting the proper ratio of ingredients, a pour castable flare having illuminating efficiency equivalent to the pressed flares presently in use is achieved.

In general, the flare mix is prepared by first stirring the binder ingredients, which are normally liquid, into homogeneity. The magnesium, preblended when multimodal magnesium is used, is then added to the binder with additional mixing to again reach homogeneity. Finally the oxidizer is added and stirred until homogeneity and adequate fluidity is obtained. For castable compositions the mix is then poured into molds or flare cases and cured for at least about one hour in a 60° to 70° C. oven. Flare candles cured in molds may be removed after curing and put into flare cases. Those compositions which are not of sufficiently low viscosity for pour casting can be placed in containers for curing by conventional means such as tamping, vibrating or pressing. The flare are ignited by means of a fuse and a small amount of igniter mix and luminous efficiency determined by light output measurements.

Several flares were prepared by this general method. The following examples illustrate the flare compositions so prepared and their efficiencies.

EXAMPLE I

Flare compositions were prepared which employed 45.5 percent bimodal, 125$\mu$ and 200$\mu$, spherical magnesium particles, 31.5 percent 30$\mu$ NaNO$_3$ along with the binder at the 24 percent level. The binder was made up of GDGE ⅔ as the epoxy resin with APO nitrate or perchlorate as curing agent. In addition the binder contained a plasticizer with the weight ratio of epoxy resin/curing agent to platsicizer being either 1:1 or 1:3, i.e., the plasticizer accounted for either 12 or 6 percent of the flare composition. The flare compositions were pour cast and tested for efficiency. Table I sets out the compositions and efficiencies of the various flare prepared.

TABLE I.—BINDER COMPOSITION

| Epoxy resin and curing agent | Plasticizer and percent | Binder ratio epoxy resin to curing agent | Percent oxygen in epoxy resin curing agent combination, percent | Average efficiency candle, sec./gm.[1] |
|---|---|---|---|---|
| GDGE ⅔ plus APO Perchlorate. | Ethylene glycol, 12%. | 1.56:1 | 32 | 24,500 |
|  | Glycerine, 6% | 1.56:1 | 32 | 22,750 |
|  | TEGDN, 6% | 1.56:1 | 32 | 28,450 |
| GDGE ⅔ plus APO nitrate. | TEGDN, 6% | 1.40:1 | 33 | 29,500 |
|  | TEGDN, 12% | 1.40:1 | 33 | 34,950 |

[1] Efficiency = $\dfrac{\int_{t_0}^{t_f} I\,dt}{W}$ where I is intensity in candles, t is time in seconds and W is flare weight in grams.

EXAMPLE II

Flare compositions were prepared using bimodal, 200$\mu$ and 125$\mu$ spherical magnesium and 30$\mu$ NaNO$_3$ at various loadings. In each case the binder which comprised 12 percent TEGDN, 7 percent GDGE ⅔ and 5 percent APO nitrate was used at the 24 percent level. The viscosity of each composition was determined before curing it at 60° to 70° C. for 72 hours. Table II sets out the relative amounts of magnesium and NaNO$_3$ used, the efficiency of each composition and its viscosity before curing.

TABLE II

| Composition | Viscosity (cps. ×10$^5$) | Average efficiency, candle sec./gm. |
|---|---|---|
| 47% Mg, 29% NaNO$_3$ | 5.87 | 45,300 |
| 48% Mg, 28% NaNO$_3$ | 3.75 | 45,800 |
| 49% Mg, 27% NaNO$_3$ | 2.50 | 52,200 |
| 50% Mg, 26% NaNO$_3$ | 2.50 | 44,400 |

Similarly, flare compositions are prepared with binder levels as low as 2 percent and as high as 30 percent. A binder level of from 18 to 24 percent is preferred for obtention of good flow characteristics and light output properties.

We claim:
1. An illuminating flare composition which comprises:
    (a) from 21 to 50 percent of a particulate alkali metal nitrate or perchlorate as oxidizer ranging in size from 10 to 750$\mu$ in the longest dimension;
    (b) from 3 to 70 percent of particulate magnesium ranging in size from 25 to 250$\mu$ in the longest dimension; and
    (c) the reaction product of an amine or acid anhydride curable epoxy resin and an amine terminated polyalkylene oxide; alkylene polyamine; alkyl, aryl or mixed alkyl-aryl amine or acid anhydride as curing agent in which the epoxy resin accounts for from 30 to 95 percent of the reaction product which is further characterized by containing at least 30 percent chemically combined oxygen together with a plasticizer containing at least 40 percent oxygen as binder, said binder making up from 2 to 30 percent of the composition and said plasticizer making up from 5 to 85 percent of the binder.

2. The flare of claim 1 which contains from 45 to 55 percent essentially spherical magnesium particles having a mean particle diameter distribution of from 125 to 250$\mu$.

3. The flare of claim 1 which contains from 25 to 33 percent sodium nitrate particles having mean diameters of from 25 to 250$\mu$ as oxidizer.

4. The flare of claim 1 wherein the epoxy resin is glycerine diglycidyl ether or a glycerine glycidyl ether having a functionality of between 2 and 3.

5. The flare of claim 1 wherein the curing agent is an amine terminated polypropylene oxide having an average molecular weight of 250 or the partial nitrate or perchlorate salt thereof.

6. The flare of claim 1 wherein the curing agent is maleic anhydride.

7. The flare of claim 1 wherein the plasticizer is triethylene glycol dinitrate.

8. The flare of claim 1 wherein the binder comprises from 18 to 30 percent of the composition and the plasticizer comprises from 30 to 65 percent of the binder.

9. The flare of claim 1 wherein the binder comprises from 2 to 30 percent of the composition and the plasticizer comprises from 20 to 65 percent of the binder.

10. The flare of claim 1 wherein the binder comprises from 18 to 24 percent of the composition.

References Cited

UNITED STATES PATENTS

| | | | |
|---|---|---|---|
| 3,418,184 | 12/1968 | Vetter | 149—38 X |
| 3,419,445 | 12/1968 | Markels | 149—19 |
| 3,432,370 | 3/1969 | Bash et al. | 149—19 |
| 3,454,436 | 7/1969 | Bedell | 149—19 |
| 3,565,706 | 2/1971 | Waite | 149—19 |

CARL D. QUARFORTH, Primary Examiner

E. A. MILLER, Assistant Examiner

U.S. Cl. X.R.

149—20, 21, 38, 41, 44, 112, 113, 114

PO-1050
(5/69)

UNITED STATES PATENT OFFICE
CERTIFICATE OF CORRECTION

Patent No. 3,673,013        Dated 27 June 1972

Inventor(s) G. A. Lane, W. A. Smith, S. C. Dollman, S. M. Kaye and F. R. Taylor

It is certified that error appears in the above-identified patent and that said Letters Patent are hereby corrected as shown below:

Column 4, line 20, delete "3" and insert --43--.

Signed and sealed this 2nd day of July 1974.

(SEAL)
Attest:

EDWARD M. FLETCHER, JR.
Attesting Officer

C. MARSHALL DANN
Commissioner of Patents